US012672225B2

(12) United States Patent
Lundström

(10) Patent No.: US 12,672,225 B2
(45) Date of Patent: Jun. 30, 2026

(54) ELECTROMAGNETIC PUMP

(71) Applicant: Excillum AB, Kista (SE)

(72) Inventor: Ulf Lundström, Kista (SE)

(73) Assignee: Excillum AB, Kista (SE)

( * ) Notice: Subject to any disclaimer, the term of this patent is extended or adjusted under 35 U.S.C. 154(b) by 292 days.

(21) Appl. No.: 18/569,038

(22) PCT Filed: Jun. 8, 2022

(86) PCT No.: PCT/EP2022/065449
§ 371 (c)(1),
(2) Date: Dec. 11, 2023

(87) PCT Pub. No.: WO2022/258641
PCT Pub. Date: Dec. 15, 2022

(65) Prior Publication Data
US 2024/0284580 A1　Aug. 22, 2024

(30) Foreign Application Priority Data
Jun. 11, 2021　(EP) ..................................... 21178939

(51) Int. Cl.
*H05G 2/00*　(2006.01)
*H02K 44/02*　(2006.01)

(52) U.S. Cl.
CPC ........... *H05G 2/0027* (2024.08); *H02K 44/02* (2013.01); *H05G 2/0035* (2024.08)

(58) Field of Classification Search
CPC .... H05G 2/0027; H05G 2/0035; H05G 2/002; H02K 44/02; H01J 2235/082; F04B 23/06; F04B 17/042
See application file for complete search history.

(56) References Cited

U.S. PATENT DOCUMENTS 7,405,416 B2 * 7/2008 Algots ................... H05G 2/007
250/493.1
7,449,703 B2 * 11/2008 Bykanov .............. H05G 2/0035
378/119

(Continued)

FOREIGN PATENT DOCUMENTS

CN 103649536 A * 3/2014 .............. F04B 53/20
DE 102014006265 A1 * 11/2014 .............. H05G 2/009

(Continued)

OTHER PUBLICATIONS

International Search Report and Written Opinion for PCT Application No. PCT/EP2022/065449, mailed on Sep. 5, 2022, 13 pages.

*Primary Examiner* — David A Vanore
(74) *Attorney, Agent, or Firm* — Brake Hughes Bellermann LLP

(57) ABSTRACT

An arrangement for providing a liquid metal jet in a vacuum environment is provided. The arrangement comprises a vacuum chamber; a nozzle arranged to provide the liquid metal jet; a jet receiver comprised within the vacuum chamber and arranged to receive liquid metal from the liquid metal jet; a first electromagnetic pump section comprising a first inlet and a first outlet, the first inlet having a first diameter; a second electromagnetic pump section comprising a second inlet and a second outlet, and a pumping conduit connecting the second inlet to said second outlet, the pumping conduit having a second diameter; wherein the first outlet is arranged to provide liquid metal to the second inlet. The first diameter is at least 1.8 times as large as the second diameter. A corresponding method is also provided.

15 Claims, 4 Drawing Sheets

(56) References Cited

U.S. PATENT DOCUMENTS

| | | | | |
|---|---|---|---|---|
| 2006/0192154 A1* | 8/2006 | Algots | .................. | H05G 2/0023 |
| | | | | 250/504 R |
| 2006/0193997 A1* | 8/2006 | Bykanov | .................. | C23C 4/123 |
| | | | | 118/720 |
| 2006/0285983 A1* | 12/2006 | Bunner | .................. | F04B 43/025 |
| | | | | 417/413.1 |
| 2014/0326904 A1* | 11/2014 | Ceglio | .................. | H05G 2/0094 |
| | | | | 250/504 R |
| 2021/0195724 A1* | 6/2021 | Takman | .................. | H05G 1/265 |

FOREIGN PATENT DOCUMENTS

| | | | | | |
|---|---|---|---|---|---|
| EP | 3525556 A1 | | 8/2019 | | |
| EP | 3736445 A1 | * | 11/2020 | ............ | H01J 35/112 |
| EP | 4102070 A1 | * | 12/2022 | ............ | F04B 17/042 |
| JP | 2006300022 A | * | 11/2006 | ............ | F04B 53/20 |
| WO | WO-9308633 A1 | * | 4/1993 | ............ | H02K 44/04 |
| WO | 2010112048 A1 | | 10/2010 | | |
| WO | WO-2013027517 A1 | * | 2/2013 | ............. | F04B 53/20 |
| WO | WO-2013031426 A1 | * | 3/2013 | ............. | F04B 53/126 |
| WO | WO-2014178177 A1 | * | 11/2014 | ............. | H01S 3/2232 |
| WO | WO-2020225333 A1 | * | 11/2020 | ............. | H01J 35/112 |

* cited by examiner

*401*

*402*

*403*

ELECTROMAGNETIC PUMP

CROSS REFERENCE TO RELATED APPLICATIONS

This application is a 35 U.S.C. § 371 National Phase Entry Application from PCT Application No. PCT/EP2022/065449, filed on Jun. 8, 2022, entitled "ELECTROMAGNETIC PUMP", and designating the U.S., which in turn claims priority to EP application Ser. No. 21/178,939.1 filed on Jun. 11, 2021, the disclosures of which are incorporated herein in their entireties by reference.

The project leading to this application has received funding from the ECSEL Joint Undertaking (JU) under grant agreement No 826589. The JU receives support from the European Union's Horizon 2020 research and innovation program and France, Germany, Austria, Italy, Sweden, Netherlands, Belgium, Hungary, Romania, Israel.

TECHNICAL FIELD

The present disclosure relates to a scheme for providing a liquid metal jet using electromagnetic pumps, particularly for use in liquid metal jet radiation sources such as X-ray sources.

BACKGROUND

Providing liquid metal jets in a vacuum environment may be useful in a number of instances. One group of examples includes radiation sources wherein an energy beam interacts with a liquid metal jet in an interaction region to produce radiation. One example within this group are liquid metal jet X-ray sources where an electron beam interacts with a liquid metal jet to produce X-ray radiation. The interaction typically takes place within a vacuum chamber to avoid oxidation of the liquid metal as well as scattering of the electrons. The X-ray radiation is conventionally emitted through an X-ray transparent window. Another example within this group are EUV sources wherein a laser beam is provided to interact with the liquid metal jet. Another group of examples concerns shielding and or cooling applications. Liquid metal jets may for instance be used to provide wall shielding in fusion reactors.

The use of electromagnetic pumps for pumping target material in liquid metal jet X-ray sources has been explored in the prior art and is a promising technology for improving jet uniformity in terms of speed, shape and cross-sectional size, and also for avoiding leakage of liquid metal. By replacing traditional pumps by electromagnetic pumps for circulating the liquid metal and for generating the liquid jet, moving parts in the pumping system can be reduced or even eliminated.

One example of an X-ray source comprising an electromagnetic pump for pumping electrically conductive liquid to be used as an electron-impact target is disclosed in WO 2020/225333, where it is proposed to arrange electromagnetic pumps in series to provide an increased final pressure.

In order to produce a liquid metal jet for use as a target in an electron beam impact X-ray source, the liquid typically needs to be pressurized to above 100 bars before it is ejected through a nozzle to produce the liquid metal jet. The raising of the pressure in the electrically conductive liquid metal may be achieved by a magnetic force resulting from the interaction between a magnetic field and an electric current flowing through the liquid. The direction of the magnetic force is generally perpendicular to the plane comprising both the direction of the electric current and the magnetic field, and by orienting this plane substantially perpendicular to the length direction of a conduit carrying the liquid metal, a flow of the liquid may be induced through the conduit. The magnetic force on a current-carrying conductor may be written as $$d\vec{F} = Id\vec{l} \times \vec{B}$$

In other words, the generated force is perpendicular to both the magnetic field and the electric current and only the components of the field and the current perpendicular to each other contribute to the generated force. The resulting magnetic force, and hence the flow of the liquid, is thus affected by the strength of the magnetic field, the current flowing through the liquid, and the length of the conduit over which the magnetic force acts. Further, the strength of the magnetic force is influenced by the angle that the magnetic field makes with the direction of the electric current. Typically, the magnetic field is thus provided perpendicular to the direction of the electric current in order to provide a maximum magnetic force.

SUMMARY

Conventional electromagnetic pumps are often designed to provide pressures in the range up to a few tens of bars. For a liquid metal jet X-ray source, however, pressures up to several hundreds of bar such as 200 bar, 350 bar, or even 1000 bar may be required. As will be appreciated, the liquid metal jet may comprise either a continuous jet of liquid, or a spray of droplets forming the jet. Also, a continuous liquid jet may spontaneously break up into droplets due to surface tension some distance away from the nozzle. The exact nature of the liquid jet is not essential to the inventive teachings provided herein.

To achieve such high pressures using an electromagnetic pump that is compact and suitable for incorporation into a liquid metal jet radiation source such as an X-ray source, it is preferred that the conduit carrying the liquid metal through the electromagnetic pump is rather narrow. Problems may then arise that gravity is insufficient to feed the pump with liquid metal from a jet receiver reservoir. In this context, it should be noted that the receiver for the liquid metal circulated e.g. in a liquid metal jet radiation source is typically located in a vacuum chamber, which means that there is no ambient pressure that assists in pushing the liquid metal into the pump. The present disclosure provides a solution to this problem by using a two-stage pumping scheme in which a first stage electromagnetic pump has a sufficiently large inlet to be fed from the receiver reservoir by the available gravitational pressure, and in which a second stage electromagnetic pump comprises a pumping conduit having a sufficiently small inner diameter to reach the required pressure. A feeding conduit of the first stage electromagnetic pump is coupled to the pumping conduit of the second stage electromagnetic pump. Hence, the first stage electromagnetic pump feeds the second stage electromagnetic pump, and the former may be fed by the gravitational pressure provided from the jet receiver reservoir.

The invention is based on an understanding of how the gravity-induced pressure creates the flow of liquid metal into the electromagnetic pump. An electromagnetic pump may be capable of increasing the pressure substantially, but the flow will be limited by the amount of liquid that enters into the pump. In a simple model the pressure rise in the pump is proportional to one over the conduit diameter, hence the artisan is encouraged to decrease the conduit diameter. On the other hand, as the diameter of the conduit becomes smaller, the viscous pressure loss within the conduit increases. The design choice will thus typically be a balance between these two effects to achieve maximum effective pressure increase. By increasing the electrical current and/or the magnetic field in the pump, the pressure may be controlled. To increase the jet velocity for a given nozzle diameter the pressure needs to be increased, as can be seen from equation (2) below showing that the pressure is proportional to the square of the jet velocity. Increasing jet velocity for a given nozzle diameter also implies increasing liquid flow. The flow however is limited by the gravity-induced pressure and the pump inlet diameter. Thus, one may end up in a situation where the jet velocity does not increase despite efforts to increase the capacity to raise pressure in the pump.

To remedy this situation a pre-pump, or a first stage pump, is introduced. The inlet of the pre-pump should be designed to accommodate the required flow given the gravity induced pressure at hand. The outlet diameter of the pre-pump should match that of the main pump inlet. The pre-pump may comprise a passive outlet part, designed to match the inlet diameter of the main pump, at which no pumping force is applied to the liquid metal. Alternatively, the pre-pump may merge with the main pump in a seamless way, e.g., by comprising a tapered feeding conduit with a first diameter matching the inlet diameter of the pre-pump and a second diameter matching the pumping conduit or inlet diameter of the main pump. Magnetic field and electrical current may be applied over the entire length of the tapered feeding conduit of the pre-pump thus eliminating any passive part of the pre-pump.

As will be discussed below, it has been found that the inlet diameter of the first stage pump should be at least 1.8 times, such as 2.5 times, the diameter of the pumping conduit of the main (second stage) pump.

There is thus provided an arrangement according to claim 1. A corresponding method for pumping liquid metal in a radiation source is also provided. The dependent claims relate to various preferred embodiments.

The second stage electromagnetic pump may have a pumping conduit of a substantially constant inner diameter. The connection between the feeding conduit of the first stage electromagnetic pump and the pumping conduit of the second stage electromagnetic pump may be implemented using a connecting conduit that connects the outlet of the feeding conduit to the inlet of the pumping conduit. Alternatively, the feeding conduit in the first stage pump may gradually decrease in diameter, e.g. by being continuously tapered, from its inlet to its outlet, such that the diameter at the outlet matches the inlet of the second stage pump.

The two electromagnetic pumps may have separate current sources. In such embodiments the connecting conduit may be electrically insulated such that no electric current can flow through the connecting conduit. In implementations where a common current source is used for both the first and the second electromagnetic pump, a path for electrical current between the first and the second electromagnetic pump can be provided by means of an electrical connection between the two pumps (i.e. separate from the conduits).

The two electromagnetic pumps may comprise permanent magnets, preferably NdFeB magnets, to provide the magnetic field. Furthermore, each pump may be provided with a yoke comprised of a ferromagnetic material such as iron, magnetic steel or the like. The design intent of such a yoke is to close the magnetic circuit, thus confining the magnetic field. This is advantageous in several respects such as in that the pump efficiency may be improved and in that a confined magnetic field does not interfere with the operation of a radiation source comprising the pump arrangement. In particular, for embodiments where an electron beam is provided for interaction with the liquid jet, avoiding stray magnetic fields provides for better control of the electron beam. To achieve said confinement a thickness of said yoke may be selected to be larger than a length of the permanent magnets along a direction parallel to the current through the electromagnetic pump scaled with a ratio between the magnetic field strength of the magnets and a saturation magnetization of the material comprising the yoke. Furthermore, the yoke may be arranged to provide mechanical support. In particular, the yoke may be configured to withstand the liquid metal pressure generated by the electromagnetic pump.

The inventive pumping scheme disclosed herein is suitably applied in liquid metal jet X-ray sources, comprising an electron source for providing an electron beam to interact with a liquid metal jet such that X-ray radiation is generated. However, the inventive scheme may also be applied to other radiation sources in which liquid metal is used as a target for generating radiation, such as sources in which radiation is generated from a laser-induced plasma or the like. Another field of application is for shielding or cooling purposes, e.g. in fusion reactors.

Several modifications and variations are possible within the scope of the invention. In particular, radiation sources comprising more than one liquid metal jet, or more than one energy beam are conceivable within the scope of the present inventive concept. Furthermore, X-ray sources of the type described herein may advantageously be combined with X-ray optics and/or detectors tailored to specific applications exemplified by but not limited to medical diagnosis, non-destructive testing, lithography, crystal analysis, microscopy, materials science, microscopy surface physics, protein structure determination by X-ray diffraction, X-ray photo spectroscopy (XPS), critical dimension small angle X-ray scattering (CD-SAXS), wide-angle X-ray scattering (WAXS), and X-ray fluorescence (XRF).

BRIEF DESCRIPTION OF THE DRAWINGS

In the detailed description below, reference is made to the accompanying drawings, on which.

DETAILED DESCRIPTION

Figure 1:
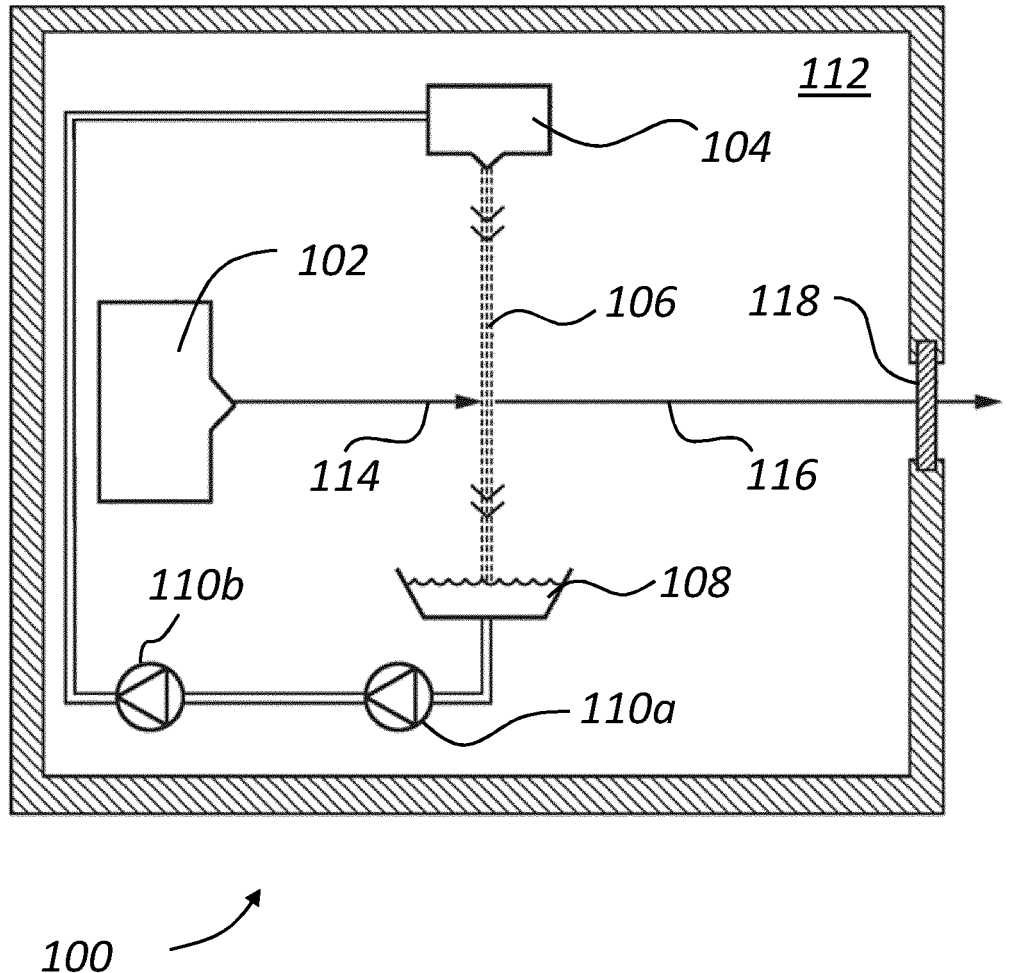
FIG. 1 schematically shows a radiation source incorporating the two-stage pumping scheme disclosed herein.

The following detailed description is given in order to allow a person of ordinary skill in the art to implement the teachings disclosed herein.

By way of introduction, it will be useful to derive some expressions/equations underlying the principles of the two-stage electromagnetic pumping scheme disclosed herein. First, some general expressions are presented relating to the pressure increase that can be obtained under a constraint of flow continuity. Then, more specific expressions applicable to liquid metal jets will be presented.

During operation, the ambient pressure within the vacuum chamber of, for example, an electron-impact X-ray source may be $10^{-6}$ mbar or less. The pressure $p_0$ available to create inflow to the first pump is then primarily (or, in practice, solely) provided by gravity and may written as $$p_0 = \rho g h_0 \qquad (1)$$

where $\rho$ is the density of the liquid metal, g is the gravitational acceleration, and $h_0$ is the vertical height between the inlet to the first pump and the surface of the receiver reservoir.

The flow velocity v associated with a pressure drop p may, to a first approximation (ignoring viscosity), be obtained from $$p = \frac{\rho v^2}{2} \qquad (2)$$

Thus, for a circular conduit, the following expression is obtained for the flow rate Q (volume per unit time), noting that flow velocity times cross sectional area equals flow rate $$Q = \sqrt{\frac{\pi^2 d^4 p}{8\rho}} \qquad (3)$$

where d is the inner diameter of the conduit. Following this, the flow rate $Q_0$ that the gravity induced pressure from a liquid column of height $h_0$ can drive through a circular aperture of diameter $d_0$ can be written as $$Q_0 = \pi d_0^2 \sqrt{\frac{g h_0}{8}} \qquad (4)$$

Since the flow rate must be the same through both pumps due to continuity (no source or sink for liquid metal along the conduits of the pumps), the pressure $p_1$ at the inlet of the second pump may be expressed in terms of the gravity-induced flow rate $Q_0$ and the inner diameter $d_1$ of the conduit of the second pump $$p_1 = \frac{8\rho Q_0^2}{\pi^2 d_1^4} = \rho g h_0 \frac{d_0^4}{d_1^4} = p_0 \left(\frac{d_0}{d_1}\right)^4 \qquad (5)$$

Thus, under the constraint of flow continuity, the available flow of liquid metal provided by gravity at the inlet to the first pump limits the pressure that can be obtained at the inlet of the second pump according to equation (5). The pressure that can be obtained at the inlet of the second pump is the gravity induced inlet pressure of the first pump amplified by the ratio of the conduit diameters to the fourth power. Having a sufficiently high column of liquid metal to raise this inlet pressure for the second pump is in many cases impractical or even impossible. For example, one decimeter of gallium only corresponds to a pressure of about 58 mbar. From this it can be concluded that the gravity-induced pressure will be too small for most practical applications, where the second pump must be able to raise the pressure to above 100 bar. Accordingly, and in accordance with the teachings disclosed herein, the pressure should be magnified at least one order of magnitude to provide sufficient pressure to feed the second pump. In other words, the diameter of the inlet to the first conduit should be at least $$1.8 \left( \approx \sqrt[4]{10} \right)$$

times the diameter of the inlet to the second conduit.

In an arrangement for providing a liquid metal jet in a vacuum environment, the situation arising from the constraints discussed in the summary above may be illustrated by some basic mathematical relations. For a given nozzle diameter $d_n$ and a desired jet velocity $v_{jet}$ the flow rate throughout the system may be calculated by noting that the flow rate Q is equal to flow velocity times the cross sectional area.

$$Q = \frac{\pi d_n^2}{4} v_{jet} \qquad (6)$$

The same flow must enter into the electromagnetic pump to preserve continuity. Thus, assuming that the inlet diameter of the pump system is do the following expressions are achieved:

$$Q = \frac{\pi d_n^2}{4} v_{jet} = \frac{\pi d_0^2}{4} v_0 \qquad (7)$$

$$d_0 = d_n \sqrt{\frac{v_{jet}}{v_0}} \qquad (8)$$

where $v_0$ is the flow velocity at the pump inlet. The relation between the pressure at the pump inlet $p_0$ and the flow velocity $v_0$ may for the inviscid case be approximated according to equation (2) above as $$p_0 = \frac{\rho v_0^2}{2} \qquad (9)$$

where $\rho$ is the density of the liquid metal. The pressure available at the inlet of the pump is the gravity-induced pressure created by the liquid metal material collected by the jet receiver. Combining equations (1) and (9) above leads to the following expression for the flow velocity:

$$v_0 = \sqrt{2 g h_0} \qquad (10)$$

By inserting this into equation (8) for the pump inlet diameter above, an expression for the pump inlet diameter may be obtained as $$d_0 = d_n \sqrt{\frac{v_{jet}}{v_0}} = d_n \sqrt{\frac{v_{jet}}{\sqrt{2 g h_0}}} \qquad (11)$$

This represents a lower bound for the pump inlet diameter. If the inlet is made smaller, the desired jet velocity will not be reached irrespective of the pumping capacity since the available flow into the pump will be the limiting factor. Thus, a lower bound on the pump inlet diameter may be written as $$d_0 > d_n \sqrt[4]{\frac{v_{jet}^2}{2gh_0}} \tag{12}$$

The pressure increase produced by an electromagnetic pump powered by a current I and a magnetic flux density B over a cross section of dimension $d_1$ may be written as $$p_1 = C\frac{BI}{d_1} \tag{13}$$

where C is a geometrical constant determined by the pump design. In a pump according to embodiments disclosed in WO 2020/225333, C may represent the number of turns the pumping conduit is wound, i.e. how many times the cross product of the current and the magnetic field should be applied. At the nozzle the attained pressure $p_1$ is used to create the desired jet velocity according to $$p_1 = C\frac{BI}{d_1} = \frac{\rho v_{jet}^2}{2} \tag{14}$$

From this an upper bound on pump conduit diameter $d_1$ may be obtained as $$d_1 < \frac{2CBI}{\rho v_{jet}^2} \tag{15}$$

For given values of the right hand side of the above relation $d_1$ must be smaller than this limiting value for the pump to be able reach the pressure required to attain the desired jet velocity.

In order for these constraints to be met with an electromagnetic pump having a constant cross sectional conduit diameter, i.e. $d_0$ equal to $d_1$, the upper bound on the conduit diameter should be larger than the lower bound on the inlet diameter. For given requirements on the jet in terms of jet velocity, nozzle diameter, and liquid metal density, this translates to a requirement on pump input in terms of the product CBI which may be written as $$CBI > \frac{\rho v_{jet}^2}{2} d_n \sqrt[4]{\frac{v_{jet}^2}{2gh_0}} \tag{16}$$

From the above relation it is evident that as the desired jet velocity is increased or the desired jet width (i.e. nozzle diameter) is increased, the requirements on the electromagnetic pump will increase. Especially crucial is the jet velocity as the pump input (CBI) has to increase like the jet velocity to the power 2.5. This becomes impractical for many applications. It is this realization that has led to the present invention of providing a dual stage electromagnetic pump. In an embodiment, two pumps are provided in series where the inlet of the first pump is chosen to fulfill the lower bound calculated above, whereas the diameter of the pumping conduit of the second pump is chosen to fulfill the upper bound as calculated above. The ratio of these two diameters must be larger than a fraction given by $$\frac{d_0}{d_1} > \frac{d_n\rho v_{jet}^2}{2CBI} \sqrt[4]{\frac{v_{jet}^2}{2gh_0}} \tag{17}$$

For typical values such as nozzle diameter 100 μm, jet velocity 100 m/s, liquid metal density 6000 kg/m$^3$, available height of liquid metal 0.1 m, magnetic flux density 1 T, current 100 A, number of turns 100, a lower bound on the diameter ratio of about 2.5 is obtained. Increasing the desired jet velocity to 200 m/s and the available current to 300 A gives a lower bound of about 4.8. It may be noted that, in the discussion above, viscous losses within the electromagnetic pump have been ignored. In practice it may thus be insufficient to use only the derived lower bound on the diameter ratio as a design criterion. In general, however, for any values of the various parameters, the diameter ratio in embodiments of the present invention is at least 1.8, which provides a ten-fold pressure increase as derived with reference to equations (1)-(5) above.

A radiation source 100 in accordance with the principles disclosed herein is schematically shown in FIG. 1. An energy source 102, a nozzle 104 for generating a liquid metal jet 106, a jet receiver with a reservoir 108, and a pumping arrangement 110a, 110b for pumping liquid metal from the reservoir 108 to the nozzle 104 are all located within a vacuum chamber 112. The energy source 102 may, for example, be an electron source that produces an electron beam 114 which interacts with the liquid metal jet 106 to generate X-ray radiation 116, which is emitted from the vacuum chamber through an X-ray transparent window 118. In other embodiments the energy source may comprise a laser that produces a laser beam which interacts with the liquid metal jet to generate extreme ultraviolet (EUV) radiation. The pumping arrangement comprises a first 110a and a second 110b electromagnetic pump, as schematically shown in FIG. 1. The first pump 110a receives liquid metal from the reservoir 108 and feeds the liquid metal to the second pump 110b.

The second (main) pump 110b can advantageously be of the kind disclosed in above-mentioned WO 2020/225333, which is hereby incorporated by reference. Such pump may comprise at least a first and a second section. A first permanent magnet may be arranged in the first section and a second permanent magnet may be arranged in the second section, wherein the first and second permanent magnets are arranged with opposite magnetic field orientations. To achieve a pumping force in the same direction along the liquid metal in both sections of the main pump, the conduit winding direction in the first section may be opposite the conduit winding direction in the second section. In this way, the electrical current can flow in the same direction through the entire arrangement. It will be appreciated that such arrangement can be extended to any number of sections, wherein the magnetic field orientations and the conduit winding directions are switched accordingly between each section.

Although the explanations and derivations above have assumed that the conduit of the second pump has a constant inner diameter, it will be understood that the second pump conduit could be tapered or have tapered sections.

Figure 2:
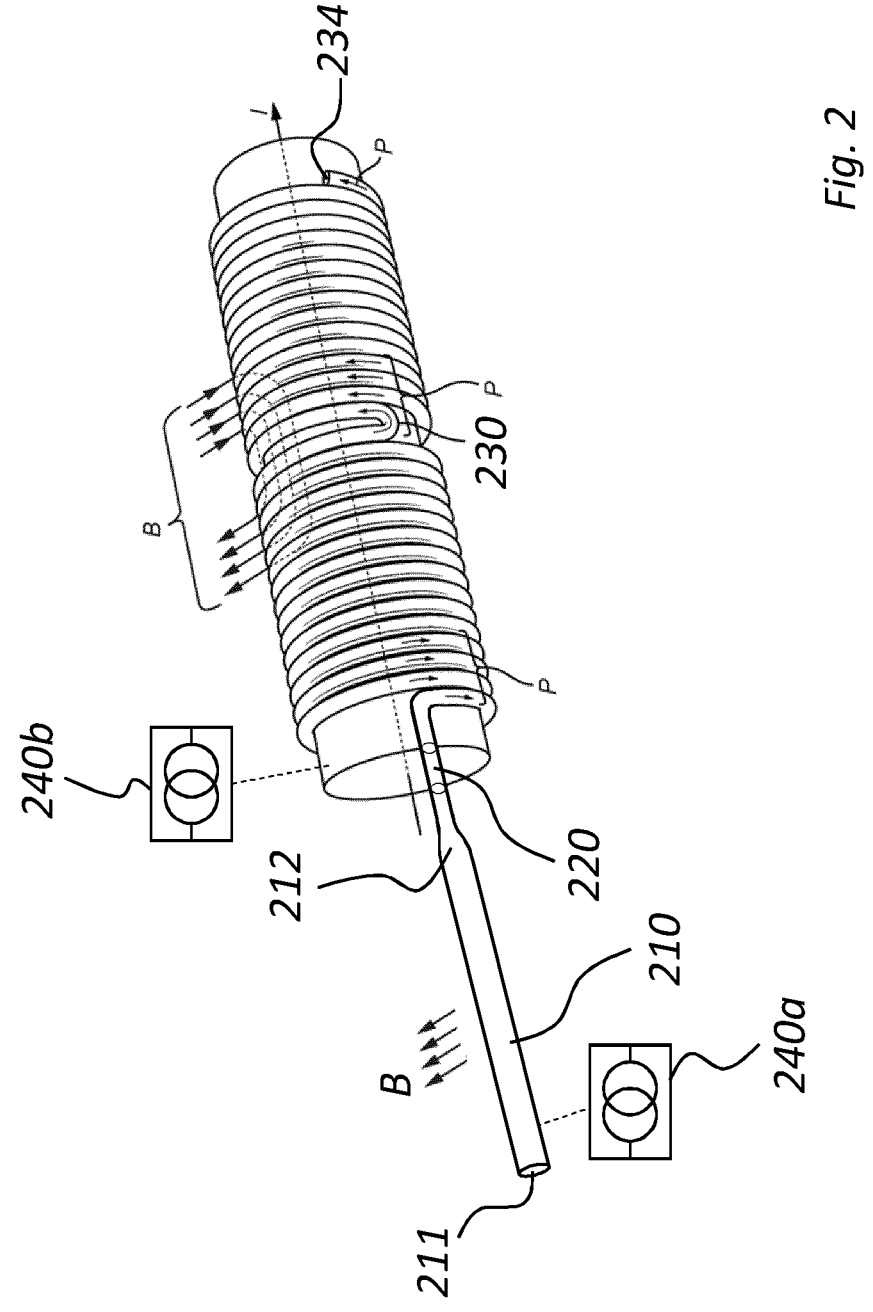
FIG. 2 schematically shows a first example of an electromagnetic pump arrangement.

According to the embodiment shown in FIG. 2, the first pump (pre-pump) comprises a substantially straight metal tube 210 of a first diameter having a first inlet 211. A magnetic field is provided perpendicularly to the tube cross section by means of a pair of permanent magnets, as indicated at B in FIG. 2. Current is provided perpendicularly to the tube cross section and to the magnetic field by means of two electrodes (not shown) brazed or otherwise attached, e.g. soldered or welded to the outside of the tube. The tube 210 of said first diameter is connected to the inlet of the second main tube 220 by means of a diameter restriction 212 attached (e.g. welded) to the tube and inlet of the second pump. The second pump (main pump) is preferably of the kind described above. A first current source 240a is connected to the pair of electrodes brazed to the pre-pump tube. A second current source 240b is connected to electrodes arranged on the ends of the second pump. The current through the second pump is indicated by the arrow I in FIG. 2. To further improve the efficiency of the first pump, an outer magnetic yoke (not shown) may be provided closing the magnetic circuit between the two permanent magnets. Alternative embodiments e.g. with one permanent magnet and a suitable yoke designed to close the magnetic circuit and provide the magnetic field as indicated at B are also comprised within the scope of the invention. The flow direction of liquid metal is indicated by P in FIG. 2, and as shown at 230, the winding direction of the conduit is reversed at the section of the pump where the magnetic field is reversed in order for the flow direction to match the magnetic field. The outlet of the second pump is indicated at 234 in FIG. 2.

Figure 3:
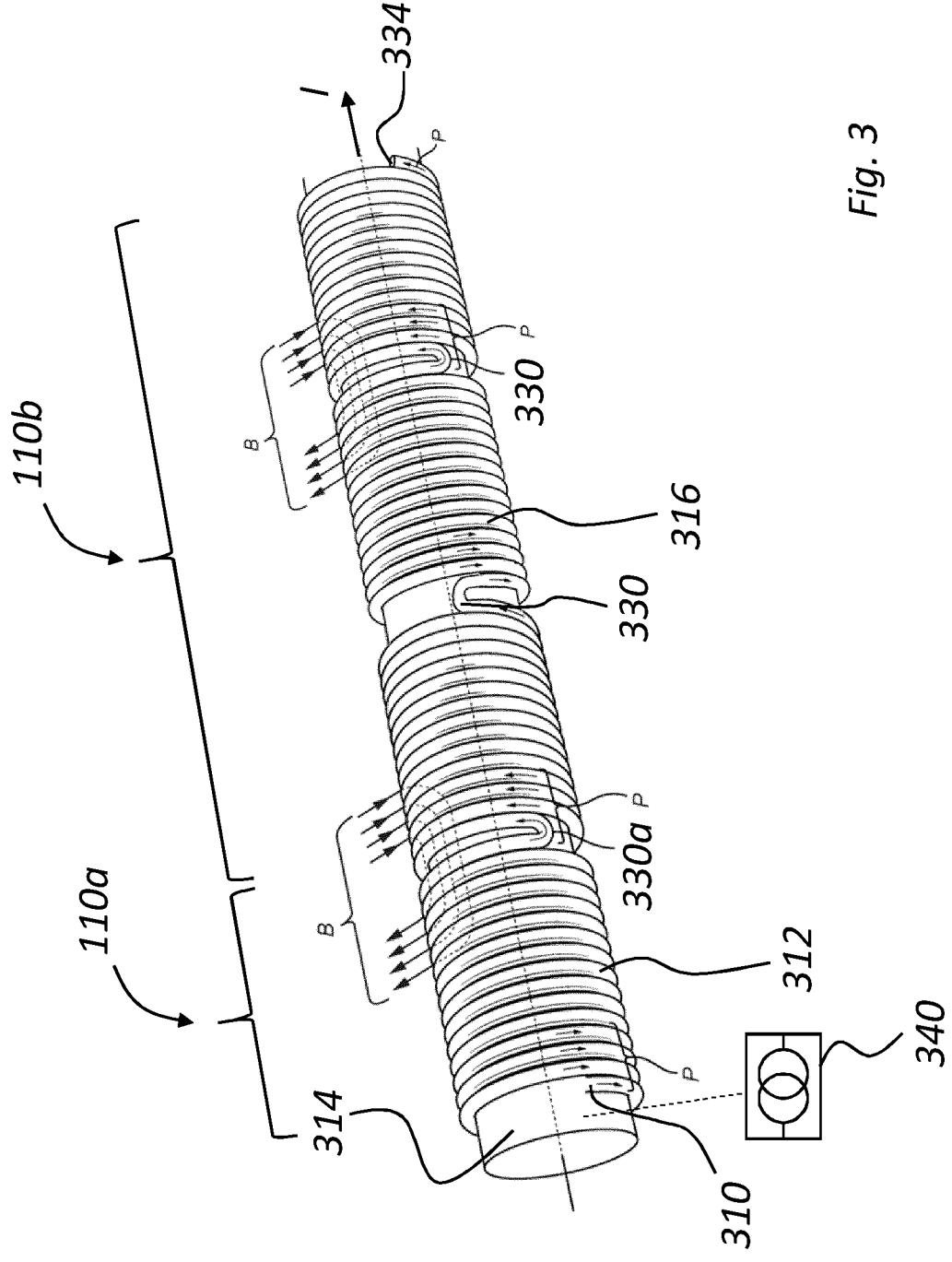
FIG. 3 schematically shows a second example of an electromagnetic pump arrangement.

According to the embodiment in FIG. 3 the first pump 110a is realized as a first section of a pump according to WO 2020/225333 briefly discussed above. Liquid from the jet receiver is fed into an inlet 310 of a first diameter. A first conduit 312 connected to said first inlet 310 is wound around a core 314 made from iron (or some other suitable magnetic material). A permanent magnet (or a plurality of permanent magnets) provides a magnetic field in a radial direction of the core perpendicularly to the cross section of the conduit. Current is applied to the conduit in a direction along the longitudinal axis of the core and thus substantially perpendicularly to the cross section of the conduit 312. The first conduit is connected to a second conduit 316 of a second diameter wound around the same core 314 in a plurality of sections with alternating winding directions. The sections comprise permanent magnets arranged such that field directions of neighboring sections are switched, as indicated by the arrows at B in FIG. 3, and the flow direction of liquid metal P is reversed correspondingly as indicated at 330. The first pump 110a in this embodiment corresponds to the first section and the second pump 110b corresponds to the ensuing sections. In this example, the first reversal of the flow direction at 330a thus corresponds to the transition from the first pump 110a to the second pump 110b. One current source 340 is arranged to provide a current/through all the segments in series. Neighboring turns of conduit are electrically connected to each other. Between sections, there are arranged electrical connections to provide a low resistance path for the current from one section to the next. The first diameter is at least 1.8 times the second diameter. To accommodate for this, the inner diameter of the outer magnets is larger in the first section as compared to the ensuing sections. The connection between the conduit in the first section and the conduit in the second section comprises a reduction in diameter from the first diameter to the second diameter. In FIG. 3, the outlet of the second pump is indicated at 334.

Figure 4:
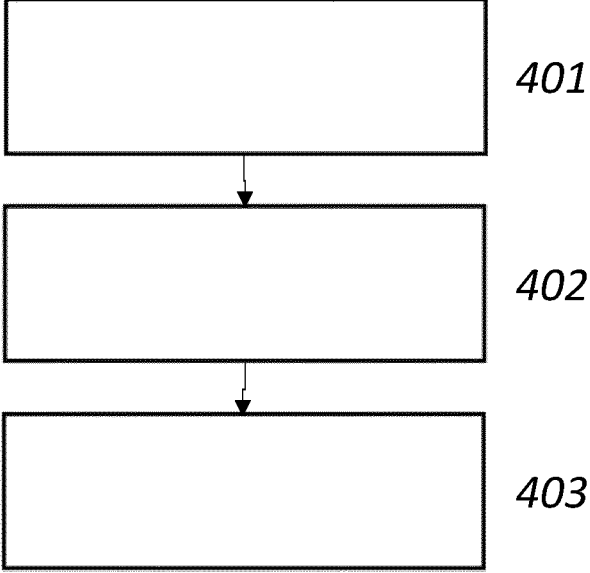
FIG. 4 is a flow chart outlining a method for pumping liquid metal in a radiation source.

A method for pumping liquid metal in a liquid metal jet radiation source is outlined in FIG. 4. While it will be understood that the pumping scheme circulates the liquid metal in a loop, the method can be described as starting with a step of collecting 401 the liquid metal in the receiver which is located in the vacuum chamber. The liquid metal is then pumped 402, using the first electromagnetic pump, from the receiver to the second electromagnetic pump. The second electromagnetic pump then pumps 403 the liquid metal to the nozzle for generating the liquid metal jet. The first electromagnetic pump has an inlet, for receiving liquid metal from the receiver, of a first diameter, and the second electromagnetic pump comprises a pumping conduit of a second diameter. In accordance with the principles disclosed herein, the first diameter is at least 1.8 times such as 2.5 times, the second diameter. A common current source can be used for providing an electrical current to both the first and the second electromagnetic pump. It is also conceivable, however, that the first and the second electromagnetic pumps have separate current sources.

In conclusion, an arrangement for providing a liquid metal jet in a vacuum environment has been disclosed. In order to achieve sufficient pressure and liquid flow to produce the jet using electromagnetic pumps, the arrangement includes a first electromagnetic pump which receives liquid metal from a reservoir and pumps the metal to the inlet of a second electromagnetic pump. The inlet pressure to the first pump is provided by gravity by means of a difference in height between the reservoir and the first pump inlet, while the inlet pressure to the second pump is provided by the first pump. A sufficient pressure increase under the restraint of flow continuity is provided by the inventive arrangement by having an inlet diameter of the first pump being at least 1.8 times a diameter of a pumping conduit of the second pump.

While the present invention has been described with reference to some specific embodiments thereof, it will be understood that various modifications and alternative implementations are possible within the scope of the appended claims.

The invention claimed is:

1. An arrangement for providing a liquid metal jet in a vacuum environment comprising:

a vacuum chamber;

a nozzle arranged to provide said liquid metal jet;

a jet receiver comprised within said vacuum chamber and arranged to receive liquid metal from said liquid metal jet;

a first electromagnetic pump section comprising a first inlet and a first outlet, said first inlet having a first diameter;

a second electromagnetic pump section comprising a second inlet and a second outlet, and a pumping conduit connecting said second inlet to said second outlet, said pumping conduit having a second diameter;

wherein said first outlet is arranged to provide liquid metal to said second inlet;

characterized in that said first diameter is at least 1.8 times as large as said second diameter.

2. The arrangement of claim 1, further comprising a feeding conduit connecting said first inlet to said second inlet, said feeding conduit having a diameter that, along said feeding conduit, decreases from the first diameter at the first inlet to the second diameter at the second inlet.

3. The arrangement of claim 2, wherein the feeding conduit is continuously tapered from the first inlet to the second inlet.

4. The arrangement of claim 1, further comprising a connecting conduit that connects the first outlet to the second inlet.

5. The arrangement of claim 1, further comprising a current source for providing an electrical current to both of the first and the second electromagnetic pump sections.

6. The arrangement of claim 5, further comprising an electrical connection between the first and the second electromagnetic pump sections providing a path for the electrical current between the first and the second electromagnetic pump.

7. The arrangement of claim 1, further comprising a first current source for providing an electrical current to the first electromagnetic pump and a second current source for providing an electrical current to the second electromagnetic pump.

8. The arrangement of claim 1, wherein said first diameter is at least 2.5 times as large as said second diameter.

9. A liquid metal jet radiation source, comprising:

an arrangement according to claim 1; and an energy source for providing an energy beam to interact with the liquid metal jet in an interaction region such that radiation is generated;

wherein said jet receiver is arranged downstream of the interaction region in a flow direction of the liquid metal jet.

10. The liquid metal jet radiation source of claim 9, wherein the radiation source is an X-ray source, and wherein the energy source is an electron source for providing an electron beam to interact with the liquid metal jet such that X-ray radiation is generated.

11. A method for providing a liquid metal jet in a vacuum environment, comprising:

collecting liquid metal in a receiver, said receiver being located in a vacuum chamber;

pumping, using a first electromagnetic pump section, the liquid metal from the receiver to a second electromagnetic pump section; and pumping, using said second electromagnetic pump section, the liquid metal to a nozzle for generating a liquid metal jet;

wherein said first electromagnetic pump section comprises a first inlet and a first outlet, said first inlet having a first diameter, and wherein said second electromagnetic pump section comprises a second inlet and a second outlet, and a pumping conduit connecting said second inlet to said second outlet, said pumping conduit having a second diameter, characterized in that said first diameter is at least 1.8 times as large as said second diameter.

12. The method of claim 11, wherein pumping, using said first electromagnetic pump section, the liquid metal from the receiver to the second electromagnetic pump section comprises pumping the liquid metal through a feeding conduit connecting said first inlet to said second inlet, said feeding conduit having a diameter that, along said feeding conduit, decreases from the first diameter at the first inlet to the second diameter at the second inlet.

13. The method of claim 11, wherein a common current source is used for providing electrical current to both the first and the second electromagnetic pump sections.

14. The method of claim 11, further comprising directing an energy beam onto the liquid metal jet to generate radiation from interaction between the energy beam and the liquid metal jet.

15. The method of claim 14, wherein the energy beam is an electron beam that interacts with the liquid metal jet to generate X-ray radiation.

* * * * *